(12) United States Patent
Lu et al.

(10) Patent No.: US 8,810,949 B2
(45) Date of Patent: Aug. 19, 2014

(54) EQUALIZATION COMBINING OUTPUTS OF MULTIPLE COMPONENT FILTERS

(71) Applicant: LSI Corporation, Milpitas, CA (US)

(72) Inventors: Jin Lu, Lafayette, CO (US); Weijun Tan, Longmont, CO (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/724,962

(22) Filed: Dec. 21, 2012

(65) Prior Publication Data

US 2014/0177087 A1  Jun. 26, 2014

(51) Int. Cl.
*G11B 5/09* (2006.01)
*G11B 20/10* (2006.01)
*G11B 5/035* (2006.01)

(52) U.S. Cl.
CPC .............................. *G11B 20/10287* (2013.01)
USPC ................................................ 360/65; 360/39

(58) Field of Classification Search
None
See application file for complete search history.

(56) References Cited

U.S. PATENT DOCUMENTS

| | | | |
|---|---|---|---|
| 6,377,529 B1 | 4/2002 | Lee et al. | |
| 6,594,094 B2 | 7/2003 | Rae et al. | |
| 7,564,388 B2 | 7/2009 | Lerdworatawee et al. | |
| 2005/0219727 A1* | 10/2005 | Kajiwara et al. | 360/39 |
| 2010/0070835 A1* | 3/2010 | Song et al. | 714/795 |

OTHER PUBLICATIONS

K. Yamaguchi et al., "12Gb/s Duobinary Signaling with x2 Oversampled Edge Equalization," IEEE International Solid-State Circuits Conference, (ISSCC), Digest of Technical Papers, Feb. 2005, pp. 70--71, vol. 1.
A. Tmcenko et al., "A New Eigenfilter Based Method for Optimal Design of Channel Shortening Equalizers," IEEE International Symposium on Circuits and Systems (ISCAS), 2002, pp. 504-507, vol. 2.
U.S. Appl. No. 13/628,513, filed in the name of J. Lu et al. On Sep. 27, 2012 and entitled "Data-Dependent Equalizer Circuit."
U.S. Appl. No. 13/628,579, filed in the name of S. Yang et al. On Sep. 27, 2012 and entitled "Branch Metric Computation and Noise Predictive Calibration/Adaptation for Over-Sampled Y Samples."

* cited by examiner

*Primary Examiner* — Daniell L Negron
(74) *Attorney, Agent, or Firm* — Ryan, Mason & Lewis, LLP

(57) ABSTRACT

An apparatus comprises read channel circuitry and associated signal processing circuitry. The signal processing circuitry comprises: an equalizer configured to combine an output of two or more component filters into a single equalized data signal; a detector with an input coupled to an output of the equalizer configured to determine a set of soft outputs, hard decision information and reliability indicators of the single equalized data signal; a decoder with an input coupled to an output of the decoder configured to perform an iterative decoding process using the set of soft outputs, hard decision information and reliability indicators to determine a decoded data signal; and a multiplexer with a first input coupled to an output of the decoder, a second input coupled to an output of the detector, and an output coupled to an input of the equalizer. The hard decision information is used to train the equalizer.

20 Claims, 7 Drawing Sheets

EQUALIZATION COMBINING OUTPUTS OF MULTIPLE COMPONENT FILTERS

FIELD OF THE INVENTION

The field of the invention relates to signal processing, and, more particularly, to processing of digital data signals.

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry and signal processing circuitry associated with the read channel circuitry. The signal processing circuitry comprises: an equalizer configured combine an output of two or more component filters into a single equalized data signal; a detector with an input coupled to an output of the equalizer, the detector being configured to determine a set of soft outputs, hard decision information and reliability indicators of the single equalized data signal; a decoder with an input coupled to an output of the detector, the decoder being configured to perform an iterative decoding process using the set of soft outputs, hard decision information and reliability indicators to determine a decoded data signal; and a multiplexer with a first input coupled to an output of the decoder, a second input coupled to an output of the detector, and an output coupled to an input of the equalizer. The hard decision information is used to train the equalizer.

Other embodiments of the invention include, by way of example and without limitation, methods, storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated signal processing circuitry for processing read channel data signals. It should be understood, however, that these and other embodiments of the invention are more generally applicable to any storage device in which improved signal processing is desired. Additional embodiments may be implemented using components other than those specifically shown and described in conjunction with the illustrative embodiments.

Figure 1:
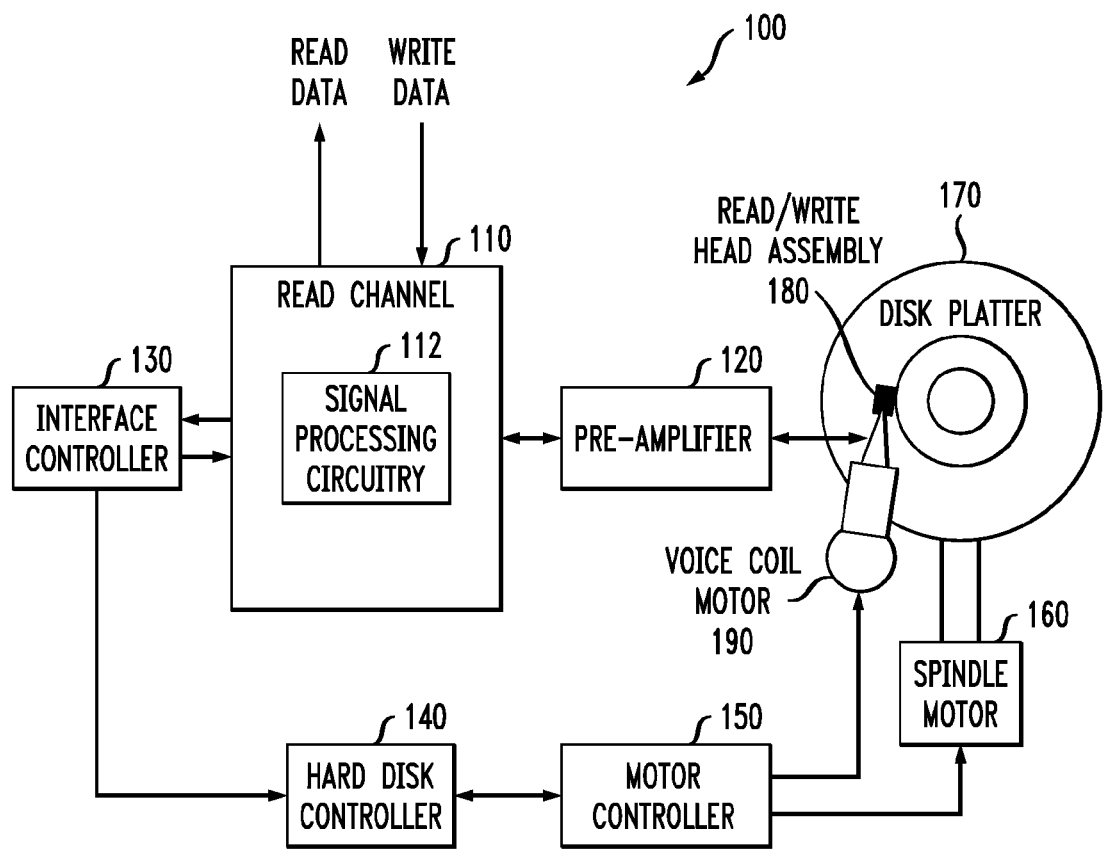
FIG. 1 shows a disk-based storage device, according to an embodiment of the invention.

The following acronyms are utilized in this description:
ADC Analog-to-Digital Converter
DFIR Digital Finite Impulse Response
HDD Hard Disk Drive
LDPC Low-Density Parity-Check
LMS Least Mean Square
MAP Maximum a Posteriori Probability
NPCAL Noise Predictive Calibrator
NPFIR Noise Predictive Finite Impulse Response
RAID Redundant Array of Independent Storage Devices
RPM Revolutions Per Minute
RS Reed Solomon
SNR Signal-to-Noise
SOVA Soft-output Viterbi Algorithm FIG. 1 shows a disk-based storage device 100 including read channel circuitry 110 having signal processing circuitry 112 in accordance with various embodiments of the invention. Although shown in FIG. 1 as being incorporated within read channel circuitry 110, the signal processing circuitry 112 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and time of data to and from disk platter 170. In some embodiments, disk platter 170 includes magnetic signals recorded in accordance with either a longitudinal or a perpendicular recording scheme.

Read/write head assembly 180 is positioned by voice coil motor 190 over a desired data track on disk platter 170. Motor controller 150 controls the voice coil motor 190. Motor controller 150 controls the voice coil motor 190 to position read/write head assembly 180 in relation to disk platter 170 and drives spindle motor 160 by moving read/write head assembly 180 to the proper data track on disk platter 170 under direction of hard disk controller 140. Spindle motor 160 spins disk platter 170 at a determined spin rate in revolutions per minute (RPM).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed.

Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

In read channel circuitry, it is advantageous to use a multiple analog-to-digital converter (ADC) arrangement. A first signal is processed in a first ADC, streamed through a first equalizer, stored in a buffer, and sent to a first noise predictive calibrator (NPCAL). A second signal is processed in a second ADC, streamed through a second equalizer, stored in a buffer and sent to a second NPCAL. The first and second signals are averaged after NPCAL processing. This multiple ADC arrangement shows good performance gain over a single ADC arrangement, but its implementation cost is high. For example, such a technique requires two complicated NPCALs and both signals must be buffered.

In order to improve the overall equalized output and thus improve detection and decoding performance, embodiments of the invention utilize an equalizer scheme which combines outputs from multiple component filters to boost read channel performance. Embodiments of the invention are thus able to achieve good performance gain while keeping implementation costs low.

Figure 2:
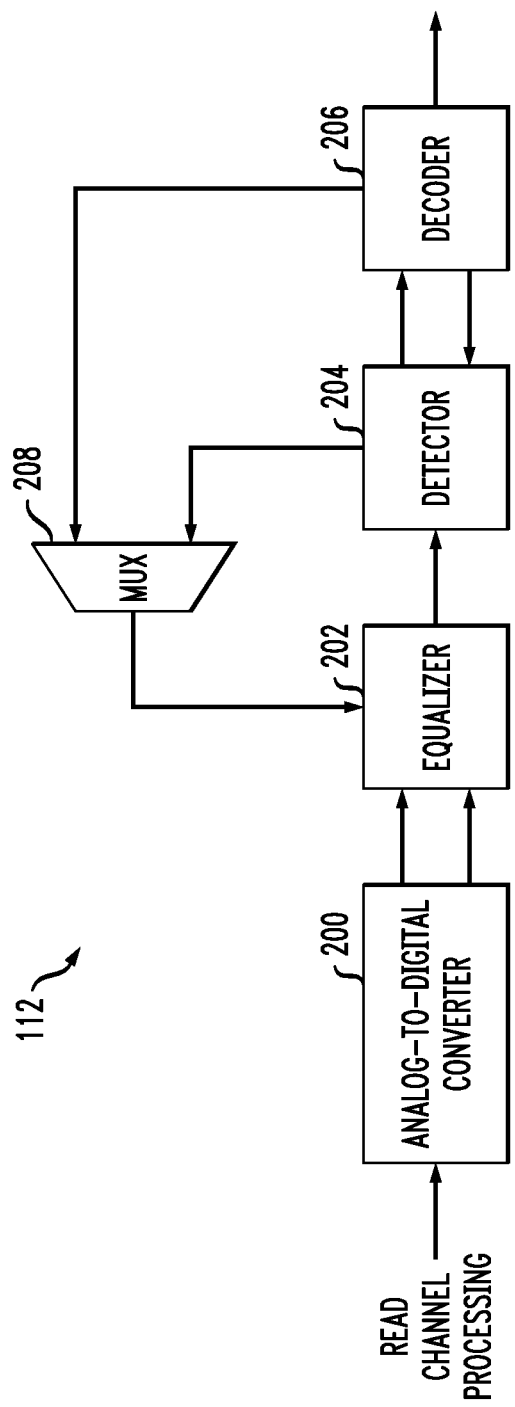
FIG. 2 is a detailed view of portions of the signal processing circuitry of FIG. 1, according to an embodiment of the invention.

FIG. 2 shows an example of portions of the signal processing circuitry 112 shown in FIG. 1. It is important to note, however, that various elements in FIG. 2 may also be implemented outside the read channel circuitry 110. An ADC 200 receives an analog signal, and converts the analog signal into two or more digital data signals. The ADC 200 may receive the analog signal after some portion of read channel processing has been performed on the analog signal.

The equalizer 202 in FIG. 2 receives two digital data signals from the ADC 200. The equalizer 202 is configured to combine the two digital data signals, as will be discussed in further detail below. Each of the digital data signals may be offset from each of the other digital data signals by a phase difference. It is important to note that while FIG. 2 shows a single ADC 200 which is configured to send two digital data signals to the single equalizer 202, in other embodiments the equalizer 202 may receive two or more digital data signals from two or more ADCs. The digital data signals may comprise oversampled signals. In addition, while FIG. 2 shows an embodiment in which the equalizer 202 receives two digital data signals from an ADC 200, embodiments of the invention are not so limited. For example, in some embodiments, the equalizer 202 may receive three or more digital data signals as will be described in further detail below. In other embodiments, the equalizer 202 may receive only a single digital data signal as will be described in further detail below.

A detector 204 has an input coupled to an output of the equalizer 202. The detector 204 is configured to receive the single equalized data signal from the equalizer 202 and to determine a set of soft outputs, hard decision information and reliability indicators of the single equalized data signal. The detector 204 may comprise a variety of detector types, including a soft-output Viterbi algorithm (SOVA) detector, a maximum a posteriori probability (MAP) detector, or some combination of SOVA and MAP detectors. The detector 204 may comprise a number of noise predictive finite impulse response (NPFIR) filters which perform noise predictive calibration on the single equalized digital data signal.

The detector 204 has an output coupled to an input of decoder 206, and an input coupled to an output of the decoder 206. The decoder 206 is configured to perform an iterative decoding process using the set of soft outputs, hard decision information and reliability indicators to determine a decoded data signal. The decoder 208 may be a low-density parity check (LDPC) decoder, a Reed Solomon (RS) decoder, or some combination of LDPC, RS and other decoder types.

Outputs of the detector 204 and the decoder 206 are coupled to inputs of a multiplexer 208. The multiplexer 208 also has an output coupled to an input of the equalizer 202. The equalizer 202 can thus be trained using the hard decision information determined by the detector 204, the decoded data signal determined by the decoder 206 or some combination of the hard decision information and the decoded data signal.

Figure 3:
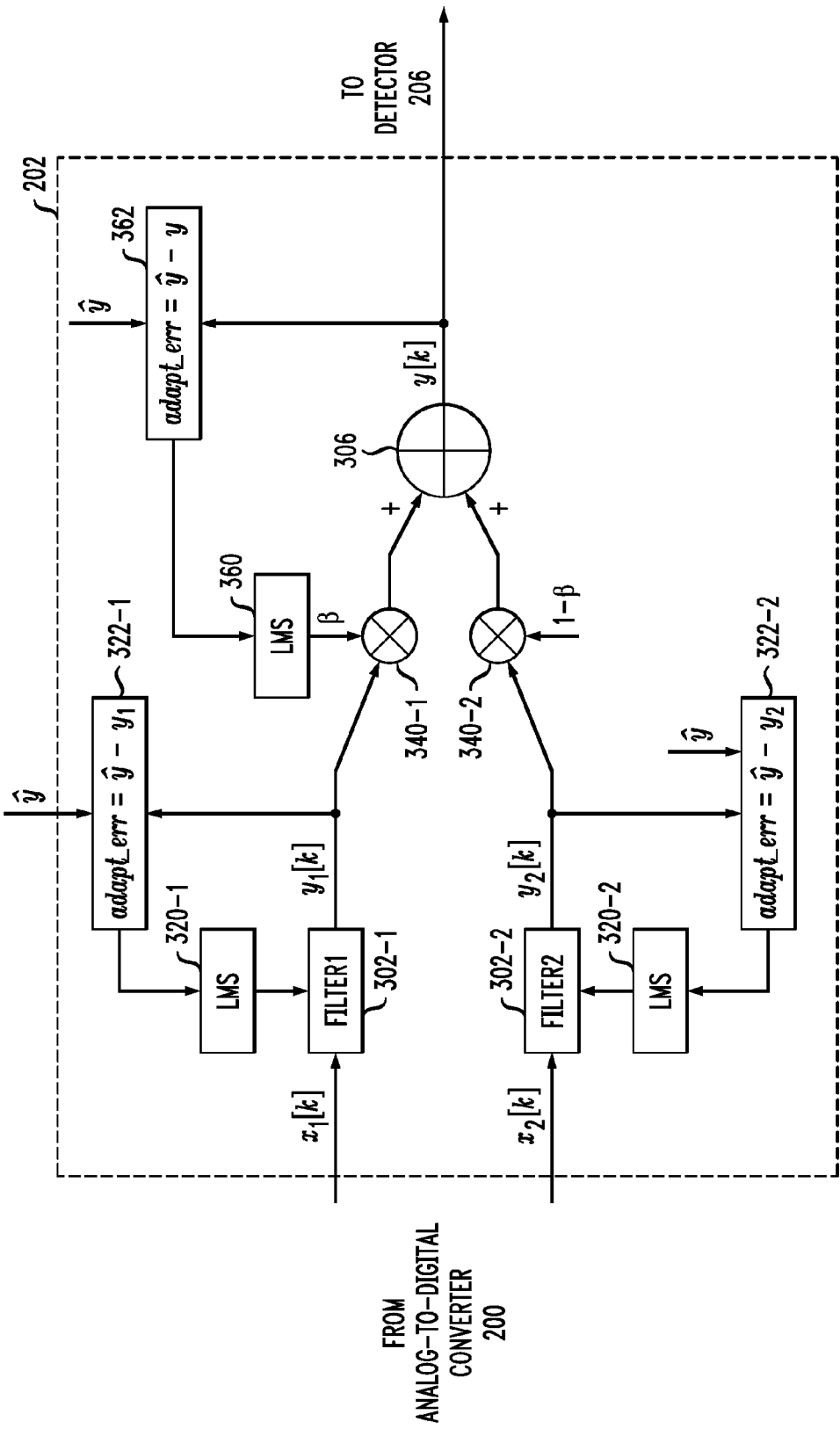
FIG. 3 is a detailed view of an equalizer, according to an embodiment of the invention.

FIG. 3 shows an example of the equalizer 202 according to an embodiment of the invention. The equalizer 202 has a first filter 302-1 and a second filter 302-2. Each of filters 302-1 and 302-2 may be referred to herein as component filters. The term component filter as used herein refers to a filter which is a component of or otherwise associated with a higher-level processing block such as the equalizer 202. Each of the component filters may be optimized for filtering a digital data signal at a given signal-to-noise (SNR) ratio. For example, filter 302-1 may be optimized for relatively low frequency noise while filter 302-2 may be optimized for relatively high frequency noise. In addition, the equalizer 202 may comprise more than two component filters. For example, in some embodiments there may be three component filters optimized for low-frequency, medium frequency, and high-frequency noise, respectively. In some embodiments, the digital data signals input to each of the component filters may be the same signal. In other embodiments, the digital data signals input to each of the component filters may be oversampled signals offset by a phase difference or other different signals.

The filters 302-1 and 302-2 may comprise digital finite impulse response (DFIR) filters. In some embodiments, each of the DFIR filters comprises a 16-tap DFIR filter. The main taps of the 16-tap DFIR filters may be set to 1.25 and 1.5 in one embodiment. Embodiments of the invention may also use only one component DFIR or some subset of the component DFIRs by setting the taps on one or more of the component DFIRs to 0. One skilled in the art, however, will readily appreciate that various other tap configurations may be used as desired for a particular arrangement.

Each of the filters 302-1 and 302-2 receives a digital data signal and performs equalization on the digital data signal to determine an equalized data signal. Each of the digital data signals may comprise a set of samples. In FIG. 3, filter 302-1 receives a set of digital samples $x_1[k]$ and determines a number of equalized samples $y_1[k]$. The filter 302-2 receives a set of digital samples $x_2[k]$ and determines a number of equalized samples $y_2[k]$. The set of digital samples $x_1[k]$ is multiplied in multiplier 340-1 by a weighting factor $\beta$, while the set of digital samples $x_2[k]$ is multiplied in multiplier 340-2 by $1-\beta$. The outputs of multiplier 340-1 and multiplier 340-2 are combined in a signal combiner 306 to determine a single set of equalized samples $y[k]$. Thus, the single set of equalized samples may be calculated according to the following equation $$y[k]=\beta y_1[k]+(1-\beta)y_2[k]. \tag{1}$$

The weighting factor β may be optimized in elements 360 and 362 using a least mean square (LMS) approach. It is important to note, however, that embodiments are not limited solely to a LMS approach, and may instead use any number of techniques for training and optimizing the weighting factor or factors as will be appreciated by one skilled in the art. The mean squared error between the set of combined equalized samples and a set of reconstructed equalized samples based on the hard decision information determined by the detector 204 may be determined according to the following equation $$\frac{1}{N}\sum_{k=1}^{N}(y[k]-\hat{y}[k])^2. \quad (2)$$

where $\hat{y}[k]$ is a set of reconstructed equalized samples based on the hard decisions determined by the detector 204 for respective ones of the combined equalized samples y[k] and N is the number of combined samples. The set of reconstructed equalized samples $\hat{y}[k]$ is obtained by convolving an equalization target with the di-pulse form of the hard decisions, where hard decisions determined by the detector take the value of +1 or −1. The hard decisions of the detector, d[k] are mapped to its di-pulse form d'[k], i.e., d'[k]=1 when d[k]=1 and d'[k]=−1 when d[k]=0. Then d'[k] is convolved with the equalization targets to obtain the set of reconstructed equalized samples $\hat{y}[k]$.

In other embodiments, the set of decoded samples in the decoded data signal determined by the decoder 206 may be used in place of the set of reconstructed equalized samples $\hat{y}[k]$ based on the hard decisions determined by the detector 204 in equation 2. In still other embodiments, some combination of the set of decoded samples in the decoded data signal determined by the decoder 206 and the set of reconstructed equalized samples $\hat{y}[k]$ based on the hard decisions determined by the detector 204 may be used in place of $\hat{y}[k]$ in equation 2.

Each of the component filters 302-1 and 302-2 may be similarly trained using an LMS approach. Elements 320-1 and 322-1 may be used to determine the mean squared error for the filter 302-1. For example, the mean squared error between the first set of equalized samples $y_1[k]$ and the set of reconstructed equalized samples $\hat{y}[k]$ which are based on the hard decisions determined by the detector 204 may be determined according to the following equation $$\frac{1}{N}\sum_{k=1}^{N}(y[k]-\hat{y}[k])^2. \quad (3)$$

Similar to equation 2 above, in other embodiments, the set of decoded samples in the decoded data signal determined by the decoder 206 may be used in place of the set of reconstructed equalized samples $\hat{y}[k]$ which are based on the hard decisions determined by the detector 204 in equation 3. In still other embodiments, some combination of the set of decoded samples in the decoded data signal determined by the decoder 206 and the set of reconstructed equalized samples $\hat{y}[k]$ which are based on the hard decisions determined by the detector 204 may be used in place of $\hat{y}[k]$ in equation 3.

Elements 320-2 and 322-2 may be used to determine the mean squared error for the filter 302-2. For example, the mean squared error between the second set of equalized samples $y_2[k]$ and the set of reconstructed equalized samples $\hat{y}[k]$ which are based on the hard decisions determined by the detector 204 may be determined according to the following equation $$\frac{1}{N}\sum_{k=1}^{N}(y[k]-\hat{y}[k])^2. \quad (4)$$

In other embodiments, the set of decoded samples in the decoded data signal determined by the decoder 206 may be used in place of the set of reconstructed equalized samples $\hat{y}[k]$ which are based on the hard decisions determined by the detector 204 in equation 4. In still other embodiments, some combination of the set of decoded samples in the decoded data signal determined by the decoder 206 and the set of reconstructed equalized samples $\hat{y}[k]$ which are based on the hard decisions determined by the detector 204 may be used in place of $\hat{y}[k]$ in equation 4. It is important to note that embodiments of the invention are not limited solely to use with a LMS approach. Instead, embodiment of the invention are more generally applicable to a variety of algorithms and techniques which may be used to adapt β and to train the component filters 302.

Figure 4:
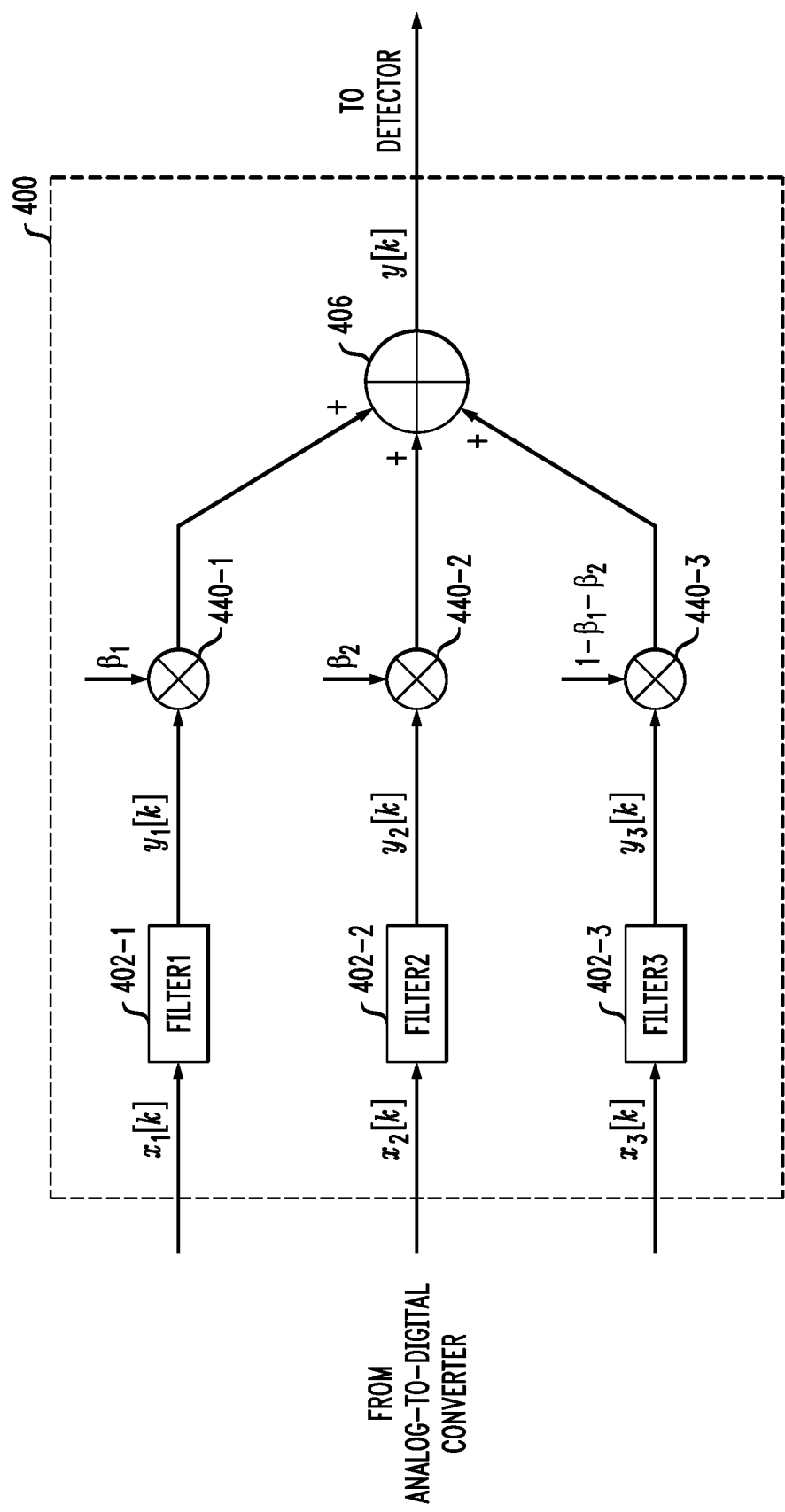
FIG. 4 is a detailed view of an equalizer, according to another embodiment of the invention.

As described above, in some embodiments an equalizer may receive more than two inputs. For example, FIG. 4 shows an equalizer 400 which receives three digital data signals denoted $x_1[k]$, $x_2[k]$ and $x_3[k]$. In some embodiments, each of the three digital data signals is received from separate ADC converters. In other embodiments, two or more of the three digital data signals are received from a single ADC converter. The equalizer 400 has three component filters 402-1, 402-2 and 402-3. Each of the component filters 402-1, 402-2 and 402-3 may be DFIR filters. Each of the component filters 402 receives one of the three digital data signals and outputs an equalized digital data signal. For example, component filter 402-1 receives digital data signal $x_1[k]$ and outputs equalized digital data signal $y_1[k]$. As discussed above, each of the component filters may be optimized for a given frequency range, a given SNR ratio, etc. In addition, each of the three digital data signals may be offset from one another by a phase difference.

As shown in FIG. 4, the equalized digital data signals are input into one of the multipliers 440-1, 440-2, 440-3. The equalized digital data signal $y_1[k]$ is input to multiplier 440-1, which multiplies $y_1[k]$ by a first weighting factor $\beta_1$. The equalized digital data signal $y_2[k]$ is input to multiplier 440-2, which multiplies $y_2[k]$ by a second weighting factor $\beta_2$. The equalized digital data signal $y_3[k]$ is input to multiplier 440-3, which multiplies $y_3[k]$ by $1-\beta_1-\beta_2$. The outputs of the multiplier 440 are input to a signal combiner 406, which adds the outputs to determine a single combined equalized digital data signal y[k]. The single combined equalized digital data signal y[k] may be output to a detector for further processing in a manner similar to that described above with respect to FIG. 2. The single combined equalized digital data signal may thus be determined according to the equation $$y[k]=\beta_1 y_1[k]+\beta_2 y_2[k]+(1-\beta_1-\beta_2)y_3[k] \quad (5)$$

The weighting factors $\beta_1$ and $\beta_2$ may be adapted in a manner similar to that described above with respect to β in FIG. 3. For clarity, the various components used to adapt and optimize weighting factors $\beta_1$ and $\beta_2$ are omitted from FIG. 4. It is important to note that while FIG. 4 shows an equalizer 400 with three component filters, embodiments of the invention may have more or less than three component filters.

Figure 5:
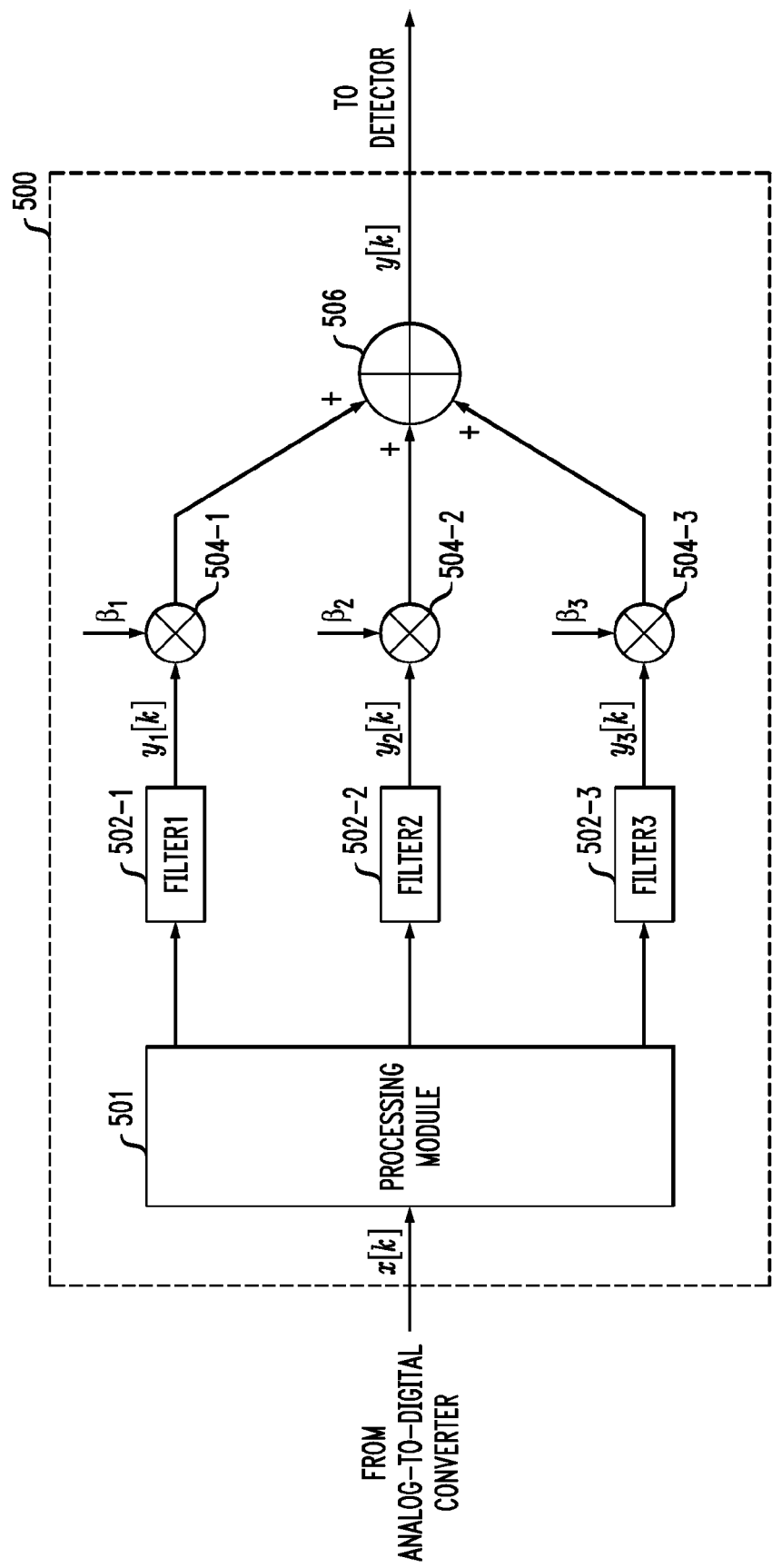
FIG. 5 is a detailed view of an equalizer, according to another embodiment of the invention.

FIG. 5 shows an equalizer 500 which receives a single digital data signal x[k] from an ADC. The single digital data signal x[k] is input to a processing module 501. The processing module 501 may be configured to separate x[k] into one or more component signals. The one or more component signals are input into one or more of the component filters 502-1, 502-2 and 502-3.

For example, the processing module 501 may determine a SNR of x[k] or some portion of x[k]. The processing module 501 may input x[k] or some portion of x[k] with a given SNR into one or more of the component filters 502-1, 502-2 and 502-3 optimized for filtering a digital data signal at the given SNR. As an example, component filter 502-1 may be optimized for high SNR, component filter 502-2 may be optimized for medium SNR, and component filter 502-3 may be optimized for low SNR. In such an instance, if the processing module 501 determines that x[k] has a high SNR, x[k] would be input to the component filter 502-1. The processing module 501 may also determine that a first portion of x[k] has a high SNR while a second portion of x[k] has low SNR. In such an instance, the first portion of x[k] is input to component filter 502-1 while the second portion of x[k] is input to component filter 502-3.

As another example, the processing module 501 may alternatively or additionally determine a frequency range of x[k]. The processing module 501 may input x[k] or some portion of x[k] with a given frequency range into one or more of the component filters 502-1, 502-2 and 502-3. At a given time $t_1$, x[k] may have a high frequency and thus be input to a component filter 502-1 optimized for filtering a high frequency signal. At a time $t_2$, x[k] may have a low frequency and thus be input to a component filter 502-3 optimized for filtering a low frequency signal.

Each of the filters 502-1, 502-2 and 502-3 determines an equalized digital data signal based on the input signal, which may be all or some portion of x[k]. The outputs of the component filters 502 are input to respective multipliers 504, which multiply the equalized digital data signal from each of the component filters 502 by a respective weighting factor. The outputs of the multipliers 504 are input to a signal combiner 506, which combines the outputs into a single equalized digital data signal y[k]. The single combined equalized digital data signal y[k] may be output to a detector for further processing in a manner similar to that described above with respect to FIG. 2.

As shown in FIG. 5, each of the multipliers 504 has a unique weighting factor. Multiplier 504-1 multiplies weighting factor $\beta_1$ and the equalized digital data signal $y_1$[k], multiplier 504-2 multiplies weighting factor $\beta_2$ and the equalized digital data signal $y_2$[k] and multiplier 504-3 multiplies weighting factor $\beta_3$ and the equalized digital data signal $y_3$[k].

In embodiments where the processing module 501 inputs x[k] into a single one of the component filters 502, each of the weighting factors $\beta_1$, $\beta_2$ and $\beta_3$ are either 0 or 1. The processing module can set the weighting factors $\beta_1$, $\beta_2$ and $\beta_3$ based on which one of the component filters 502 has received x[k].

In embodiments where the processing module 501 inputs x[k] into each of the component filters 502, or inputs portions of x[k] into two or more of the component filters, each of the weighting factors $\beta_1$, $\beta_2$ and $\beta_3$ may be adjusted individually. For example, if filters 502-1 and 502-3 each receive a portion of x[k] as input, the weighting factors $\beta_1$ and $\beta_3$ may be set based on the size of the portion of x[k] input to each of the filters 502-1 and 502-3. If each of the filters 502 receives x[k], the weighting factors $\beta_1$, $\beta_2$ and $\beta_3$ may be adjusted based on one or more determined characteristics of x[k]. For example, if x[k] is determined to have a high SNR, the weighting factors for the component filter or filters optimized for higher SNR are set higher than the weighting factors for the component filter or filters which are not optimized for higher SNR. Similarly, if x[k] is determined to have a high frequency, the weighting factors for the component filter or filters optimized for high frequency input are set higher than the component filter or filters which are not optimized for high frequency input. One skilled in the art will appreciate that numerous alternative arrangements may be used for setting the weighting factors.

The processing module 501 may be configured to adjust the weighting factors $\beta_1$, $\beta_2$ and $\beta_3$. Alternatively or additionally, the weighting factors $\beta_1$, $\beta_2$ and $\beta_3$ may be adapted based on feedback in a manner similar to that as described above with respect to FIG. 3.

It is important to note that various embodiments described above separately may be combined in a single embodiment of the invention. By way of example only, the processing module 501 may be configured to determine both the SNR and the frequency of x[k]. Each of the component filters of equalizer 500 may thus be optimized for filtering an input signal with a given SNR and a given frequency range. In addition, the processing module 501 may determine other characteristics of x[k], such as the phase of x[k]. As another example, the arrangement of FIG. 5 may be adapted for receiving two or more digital data signals $x_1$[k], $x_2$[k], etc. as in the arrangements of FIGS. 3 and 4.

Embodiments of the invention which use an enhanced equalizer to combine multiple digital data signals into a single equalized digital signal reduce a signal path from two to one. The use of a single equalized digital signal achieves performance gains similar to approaches which use multiple ADCs and multiple NPCALs, as will be described below. From a signal processing perspective, a first noise term can be calculated using a first component DFIR according to the following equation $$\text{Noise}_1 = \text{DFIR}_1 * x_1 - \text{mean}(\text{DFIR}_1 * x_1) - \text{bias}(\text{DFIR}_1 * x_1) \quad (6)$$

where $\text{Noise}_1$ represents the noise of the first component digital data signal $x_1$ and $\text{DFIR}_1$ represents processing performed by a first component DFIR. Similarly, a second noise term can be calculated using a second component DFIR according to the following equation $$\text{Noise}_2 = \text{DFIR}_2 * x_2 - \text{mean}(\text{DFIR}_2 * x_2) - \text{bias}(\text{DFIR}_2 * x_2) \quad (7)$$

where $\text{Noise}_2$ represents the noise of the second component digital data signal $x_2$ and $\text{DFIR}_2$ represents processing performed by a second component DFIR. A combined noise term Noise can thus be determined according to the following equation $$\text{Noise} = 0.5(\text{Noise}_1 + \text{Noise}_2) \quad (8)$$

where 0.5 is chosen as weighting factor where each of the component digital data signals is accorded the same weight for simplicity. In embodiments of the invention, however, the weighting factor may vary as desired for a particular arrangement. The weighting factor, as described above, may also be adapted using a LMS approach.

If the digital data signals are combined a single equalized signal y' is determined according to the following equation $$y' = 0.5(y_1 + y_2) = 0.5(\text{DFIR}_1 * x_1 + \text{DFIR}_2 * x_2) \quad (9)$$

where $y_1$ is the equalized data signal determined in $\text{DFIR}_1$ and $y_2$ is the equalized data signal determined in $\text{DFIR}_2$. Thus, the noise term Noise may be determined according to the following equation $$\text{Noise} = y' - \text{mean}(y') - 0.5(\text{bias}(y_1) + \text{bias}(y_2)). \quad (10)$$

If bias(y') is approximately 0.5(bias(y$_1$)+bias(y$_2$)), then the noise term Noise may be determined according to the following equation $$\text{Noise} = y' - \text{mean}(y') - \text{bias}(y'). \quad (11)$$

Thus, the use of component DFIRs in embodiments of the invention can achieve similar performance gains as arrangements which use separate equalizers and NPCALs while reducing complexity of the signal processing circuitry.

Figure 6:
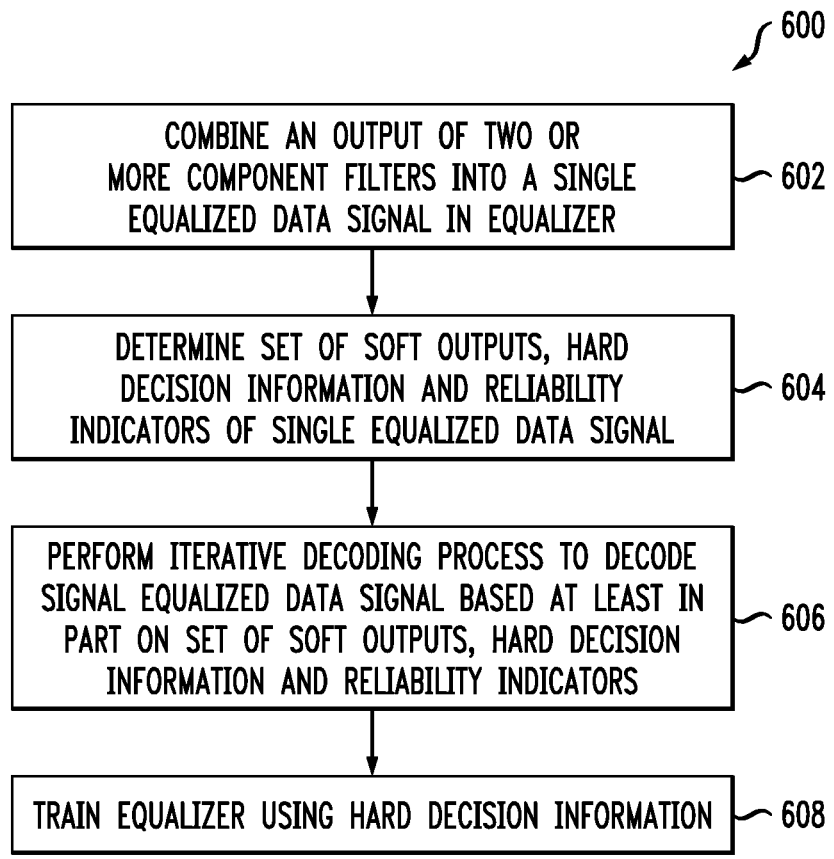
FIG. 6 is a methodology of enhanced equalization, according to an embodiment of the invention.

FIG. 6 illustrates a methodology 600 in accordance with an embodiment of the invention. The methodology 600 begins with step 602, wherein an output of two or more component filters is combined into a single equalized data signal in an equalizer. In some embodiments, step 602 may comprise filtering each of one or more digital data signals in a given one of two or more component filters and combining the filtered digital data signals into the single equalized digital data signal. Next, a set of soft outputs, hard decision information and reliability indicators of the single equalized data signal are determined in step 604. Step 604 may be performed in one or more detectors such as detector 204 in FIG. 2. In step 606, the set of soft outputs, hard decision information and reliability indicators are used to perform an iterative decoding process to decode the single equalized digital data signal. Finally, in step 608 the hard decision information is used to train the equalizer. As discussed above, in some embodiments the decoded data signal or some combination of the hard decision information and the decoded data signal are used to train the equalizer.

As mentioned previously, the storage device configuration can be varied in other embodiments of the invention. For example, the storage device may comprise a hybrid HDD which includes a flash memory in addition to one or more storage disks.

In addition, storage device 100 may be coupled to or incorporated within a host processing device, which may be a computer, server, communication device, etc.

Figure 7:
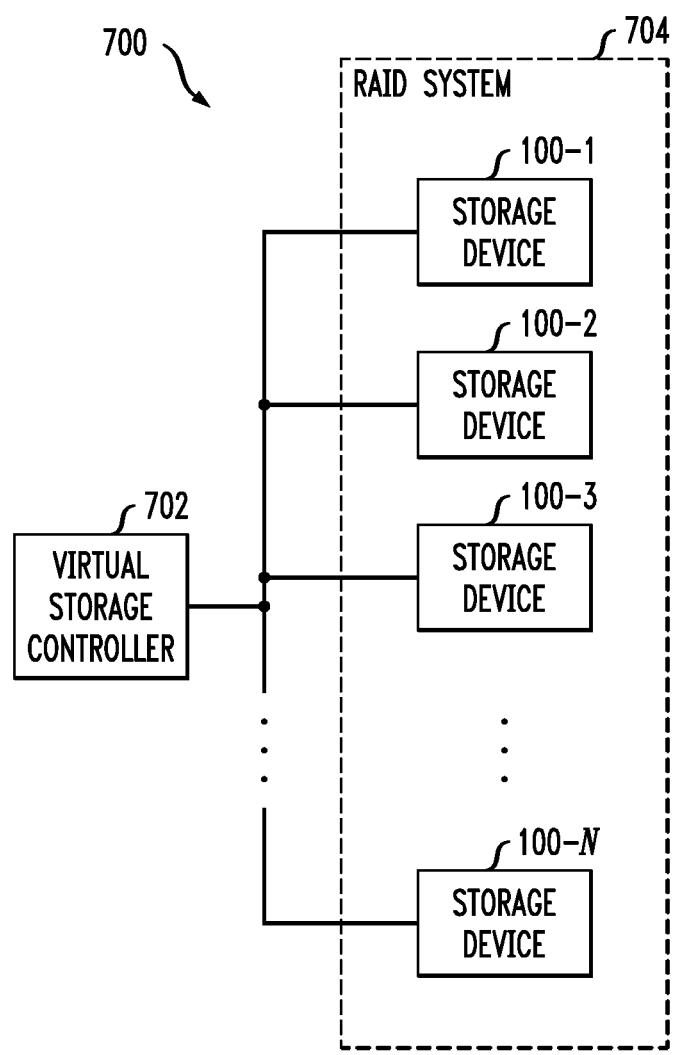
FIG. 7 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry 112 as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described error correction functionality. Also, the particular manner in which certain steps are performed in the signal processing may vary. Further, although embodiments of the invention have been described with respect to storage disks such as HDDs, embodiments of the invention may be implemented various other devices including optical data-storage applications and wireless communications. These and numerous other alternative embodiments within the scope of the following claims will be apparent to those skilled in the art.

What is claimed is:

1. An apparatus, comprising:
   read channel circuitry; and
   signal processing circuitry associated with the read channel circuitry, the signal processing circuitry comprising:
      an equalizer configured to combine an output of two or more component filters into a single equalized data signal;
      a detector with an input coupled to an output of the equalizer, the detector being configured to determine a set of soft outputs, hard decision information and reliability indicators of the single equalized data signal;
      a decoder with an input coupled to an output of the detector, the decoder being configured to perform an iterative decoding process using the set of soft outputs, hard decision information and reliability indicators to determine a decoded data signal; and
      a multiplexer with a first input coupled to an output of the decoder, a second input coupled to an output of the detector, and an output coupled to an input of the equalizer;
   wherein a selected one of the hard decision information of the single equalized data signal and hard decision information of the decoded data signal is provided at the output of the multiplexer and is used to train the equalizer.

2. The apparatus of claim 1, wherein the equalizer has an input coupled to one or more analog-to-digital converters, the equalizer being configured to receive two or more digital data signals from the one or more analog-to-digital converters, each of the two or more component filters receiving a given one of the two or more digital data signals.

3. The apparatus of claim 2, wherein each of the digital data signals received from each of the one or more analog-to-digital converters is offset from each of the other digital data signals by a phase difference.

4. The apparatus of claim 1, wherein the equalizer has an input coupled to one or more analog-to-digital converters, the equalizer being configured to receive a digital data signal from a given one of the one or more analog-to-digital converters and to input the digital data signal into at least one of the two or more component filters.

5. The apparatus of claim 4, wherein the equalizer is configured to separate the digital data signal into two or more component digital data signals, each of the two or more component digital data signals comprising a portion of the digital data signal at a given frequency range, each of the two or more component digital data signals being input to a given one of the two or more component filters optimized for filtering at the given frequency range.

6. The apparatus of claim 4, wherein the equalizer is configured to separate the digital data signal into two or more component digital data signals, each of the two or more component digital data signals comprising a portion of the digital data signal at a given signal-to-noise ratio, each of the two or more component digital data signals being input to a given one of the two or more component filters optimized for filtering at the given signal-to-noise ratio.

7. The apparatus of claim 1, wherein the two or more component filters are digital finite impulse response filters.

8. The apparatus of claim 7, wherein each of the two or more digital finite impulse response filters is optimized for filtering a digital data signal at a given signal-to-noise ratio.

9. The apparatus of claim 7, wherein each of the two or more digital finite impulse response filters is trained independently based at least in part on a selected one of the hard decision information of the single equalized data signal and hard decision information of the decoded data signal as provided at the output of the multiplexer.

10. The apparatus of claim 1, wherein each of the one or more digital data signals comprises a set of digital samples.

11. The apparatus of claim 10, wherein the two or more component filters comprise digital finite impulse response filters, each of the two or more component digital finite impulse response filters being configured to determine a set of component equalized samples from the one or more sets of digital samples.

12. The apparatus of claim 10, wherein the equalizer comprises two or more component digital finite impulse response filters, each of the two or more component digital finite impulse response filters being configured to determine a set of component equalized samples from a given one of the one or more sets of digital samples.

13. The apparatus of claim 12, wherein the equalizer is configured to combine the sets of component equalized samples into a set of combined equalized samples by applying a weighting factor to each of the sets of component equalized samples.

14. The apparatus of claim 13, wherein the equalizer comprises two component digital finite impulse response filters and the set of combined equalized samples is determined according to the following equation:

$$y[k]=\beta y_1[k]+(1-\beta)y_2[k]$$

wherein y[k] is the combined equalized samples, $\beta$ is the weighting factor, $y_1[k]$ is a first set of equalized samples and $y_2[k]$ is a second set of equalized samples.

15. The apparatus of claim 13, wherein the weighting factor is optimized by minimizing the mean squared error according to the following equation:

$$\frac{1}{N}\sum_{k=1}^{N}(y[k]-\hat{y}[k])^2$$

wherein y[k] is the combined equalized samples, $\hat{y}[k]$ is a set of reconstructed equalized samples based on a hard decision determined by the detector for each of the combined equalized samples, and N is the number of combined samples.

16. The apparatus of claim 1 wherein the read channel circuitry and associated signal processing circuitry are fabricated in at least one integrated circuit.

17. A storage device comprising the apparatus of claim 1.

18. A virtual storage system comprising the storage device of claim 17.

19. A method comprising the steps of:
combining, in an equalizer, an output of two or more component filters into a single equalized data signal;
determining, in a detector, a set of soft outputs, hard decision information and reliability indicators of the single equalized data signal;
performing, in a decoder, an iterative decoding process to decode the single equalized data signal based at least in part on the set of soft outputs, hard decision information and reliability indicators;
selecting, in a multiplexer, one of the hard decision information of the single equalized data signal and hard decision information of the decoded data signal; and
training the equalizer based at least in part on the selected one of the hard decision information of the single equalized data signal and hard decision information of the decoded data signal.

20. A storage device comprising:
at least one storage medium;
a read head configured to read data from the storage medium; and
control circuitry coupled to the read head and configured to process data received from the read head;
the control circuitry comprising:
read channel circuitry; and
signal processing circuitry associated with the read channel circuitry, the signal processing circuitry comprising:
an equalizer configured to combine an output of two or more component filters into a single equalized data signal;
a detector with an input coupled to an output of the equalizer, the detector being configured to determine a set of soft outputs, hard decision information and reliability indicators of the single equalized data signal;
a decoder with an input coupled to an output of the detector, the decoder being configured to perform an iterative decoding process using the set of soft outputs, hard decision information and reliability indicators to determine a decoded data signal; and
a multiplexer with a first input coupled to an output of the decoder, a second input coupled to an output of the detector, and an output coupled to an input of the equalizer;
wherein a selected one of the hard decision information of the single equalized data signal and hard decision information of the decoded data signal is provided at the output of the multiplexer and is used to train the equalizer.

* * * * *